(12) United States Patent
Bong et al.

(10) Patent No.: US 12,215,203 B2
(45) Date of Patent: Feb. 4, 2025

(54) METHOD FOR PRODUCING MICROPARTICLES

(71) Applicant: Korea University Research and Business Foundation, Seoul (KR)

(72) Inventors: Ki Wan Bong, Seoul (KR); Hyeon Ung Kim, Seoul (KR)

(73) Assignee: Korea University Research and Business Foundation, Seoul (KR)

(*) Notice: Subject to any disclaimer, the term of this patent is extended or adjusted under 35 U.S.C. 154(b) by 651 days.

(21) Appl. No.: 17/442,897

(22) PCT Filed: Mar. 5, 2020

(86) PCT No.: PCT/KR2020/095017
§ 371 (c)(1),
(2) Date: Sep. 24, 2021

(87) PCT Pub. No.: WO2020/197365
PCT Pub. Date: Oct. 1, 2020

(65) Prior Publication Data
US 2022/0195129 A1 Jun. 23, 2022

(30) Foreign Application Priority Data
Mar. 27, 2019 (KR) .......... 10-2019-0034986

(51) Int. Cl.
*B29C 33/38* (2006.01)
*B29C 33/70* (2006.01)
*C08J 3/12* (2006.01)

(52) U.S. Cl.
CPC ............ *C08J 3/12* (2013.01); *B29C 33/3878* (2013.01); *B29C 33/70* (2013.01)

(58) Field of Classification Search
CPC ..... B29C 33/70; B29C 33/3878; B29C 33/38; C08J 3/12; B29K 2823/06; B29K 2883/00; B29K 2901/10; B29K 2875/00
See application file for complete search history.

(56) References Cited

U.S. PATENT DOCUMENTS

| 4,681,718 A | * | 7/1987 | Oldham .............. B29C 35/0222 |
| | | | 264/331.12 |
| 7,077,986 B2 | * | 7/2006 | Kurihara ................. B29C 44/04 |
| | | | 264/51 |

FOREIGN PATENT DOCUMENTS

| JP | 2002-172645 A | 6/2002 |
| KR | 10-1985-0008291 A | 12/1985 |
| KR | 10-2010-004818 A | 5/2010 |
| KR | 10-2015-0014258 A | 2/2015 |
| KR | 10-1612093 B1 | 4/2016 |

OTHER PUBLICATIONS

International Search Report for PCT/KR2020/095017 dated, Dec. 18, 2020 (PCT/ISA/210).

\* cited by examiner

*Primary Examiner* — Monica A Huson
(74) *Attorney, Agent, or Firm* — Sughrue Mion, PLLC

(57) ABSTRACT

The present invention provides a method for producing microparticles in which a porous micromold is degassed such that a precursor solution is quickly loaded into the micromold through the suction force of the micromold regardless of the viscosity and wettability of the precursor solution.

13 Claims, 9 Drawing Sheets

[FIG. 1A]
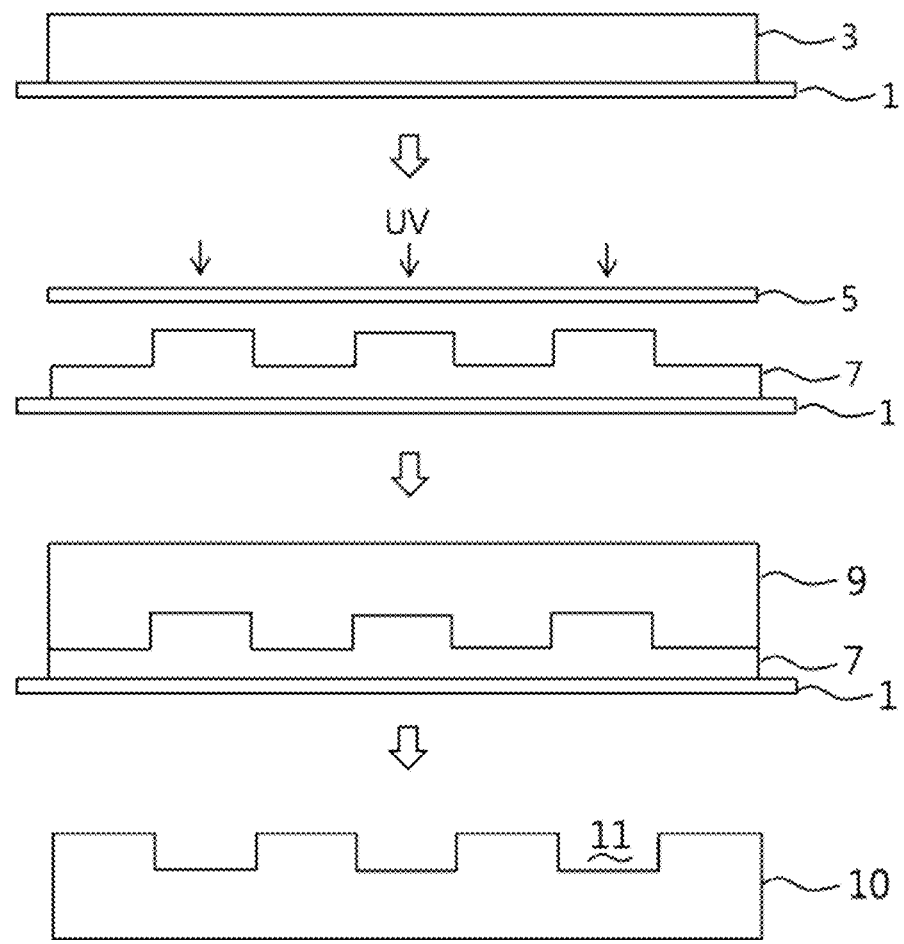
[FIG. 1B]

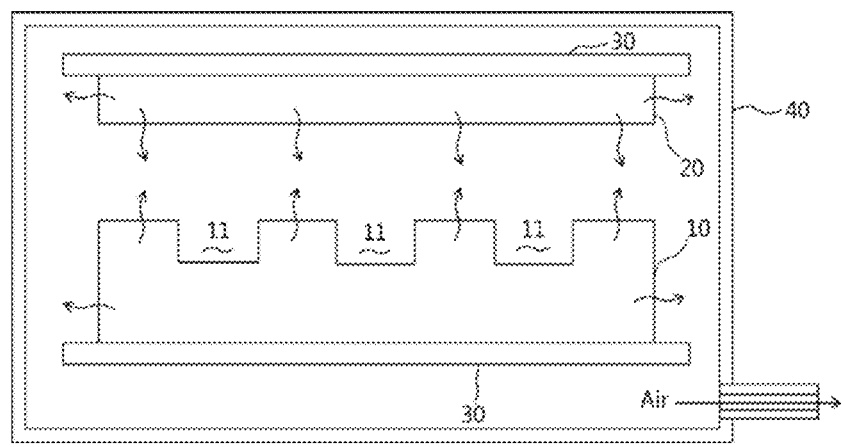
[FIG. 2]
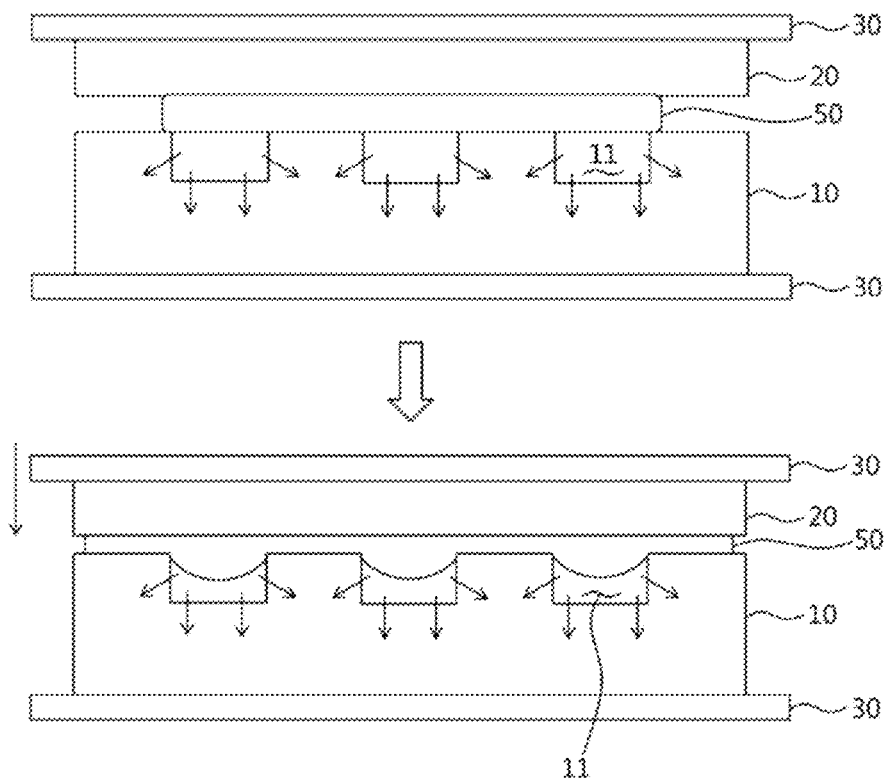
[FIG. 3]

[FIG. 4]
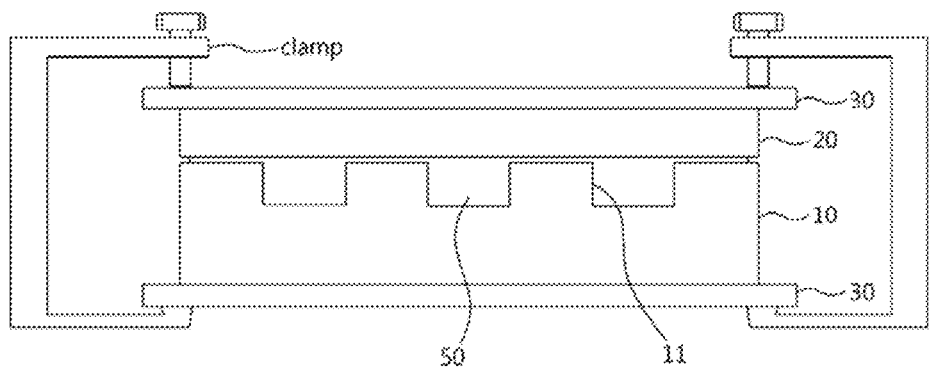
[FIG. 5A]
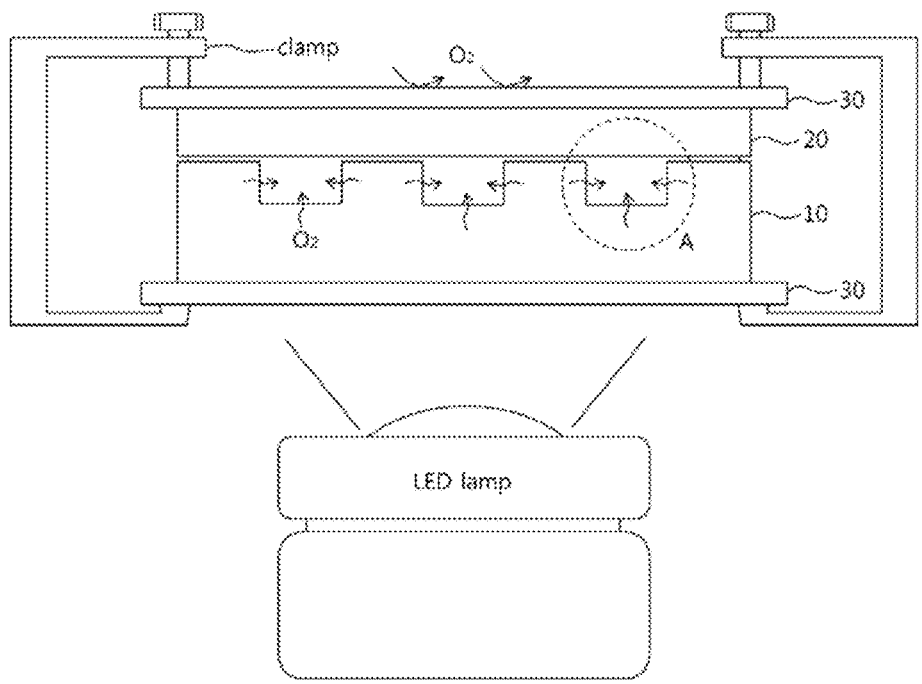

[FIG. 5B]
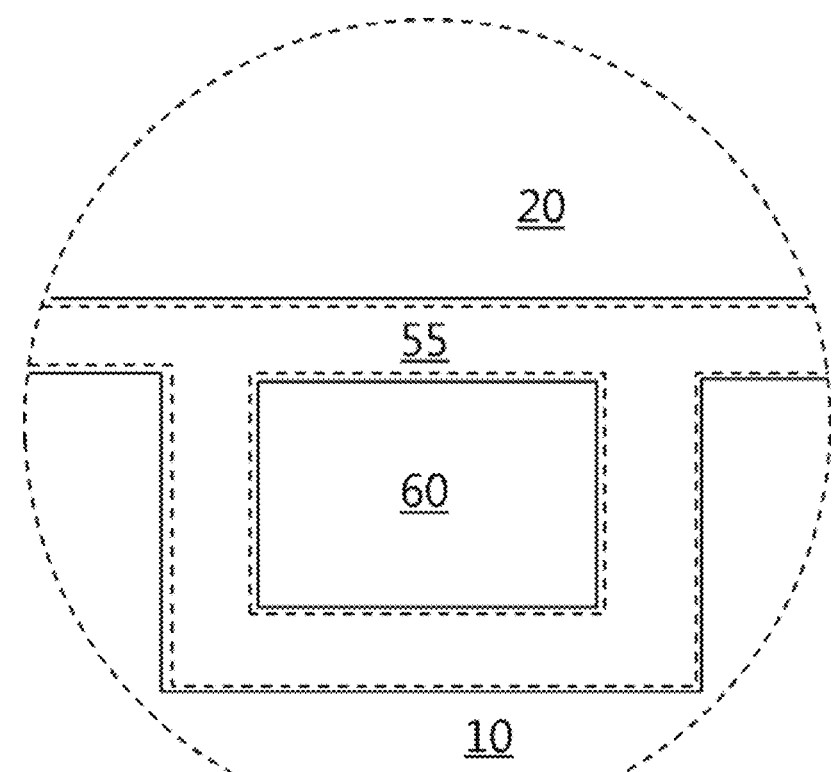
[FIG. 5C]
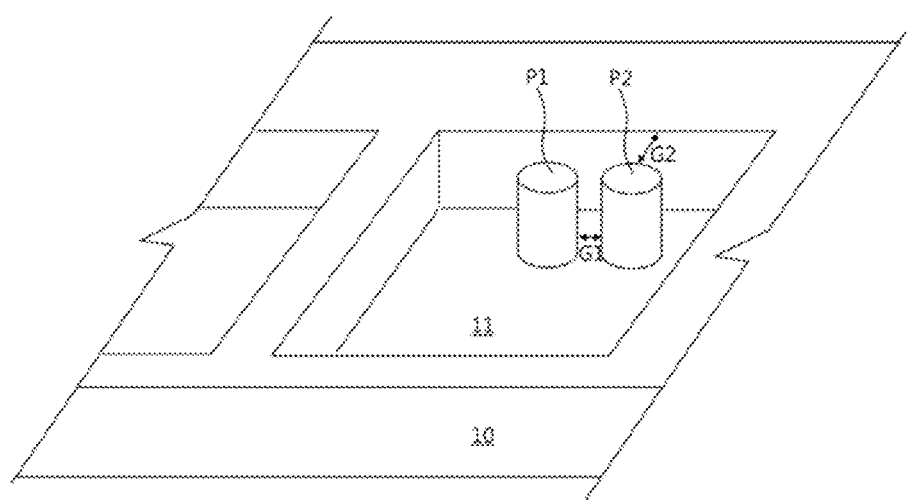

[FIG. 6A]
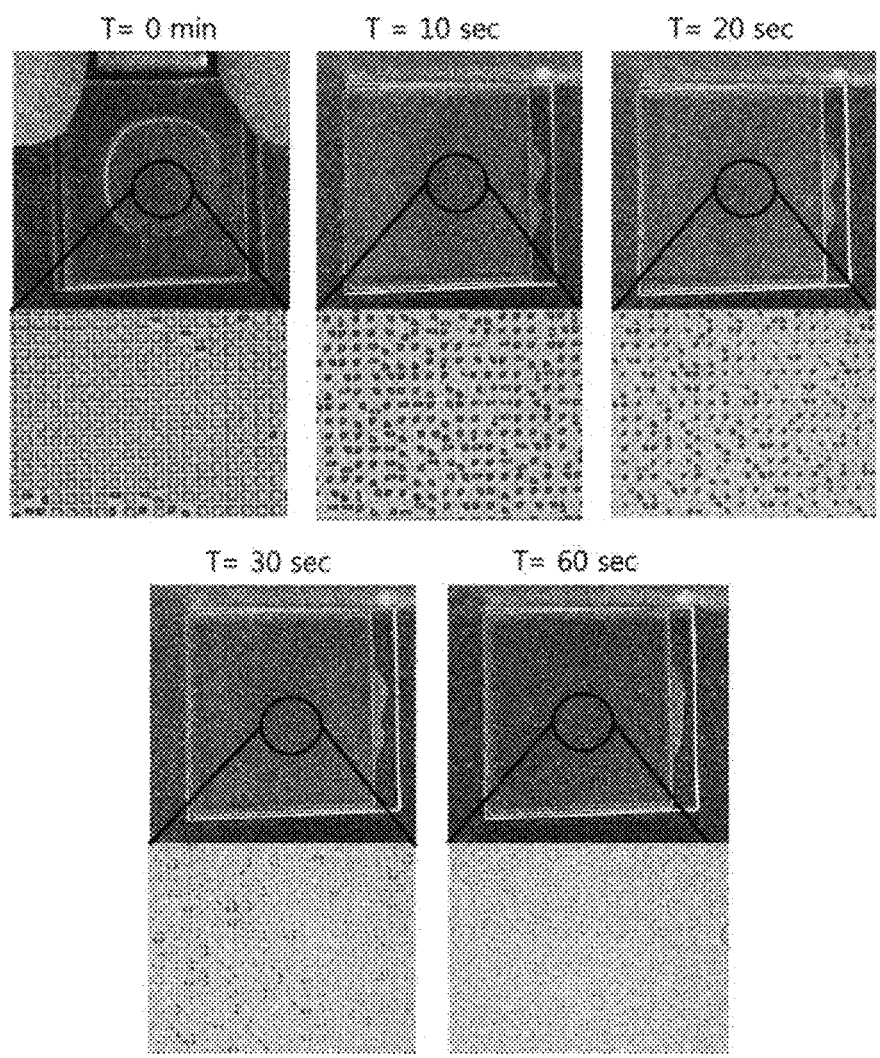

[FIG. 6B]
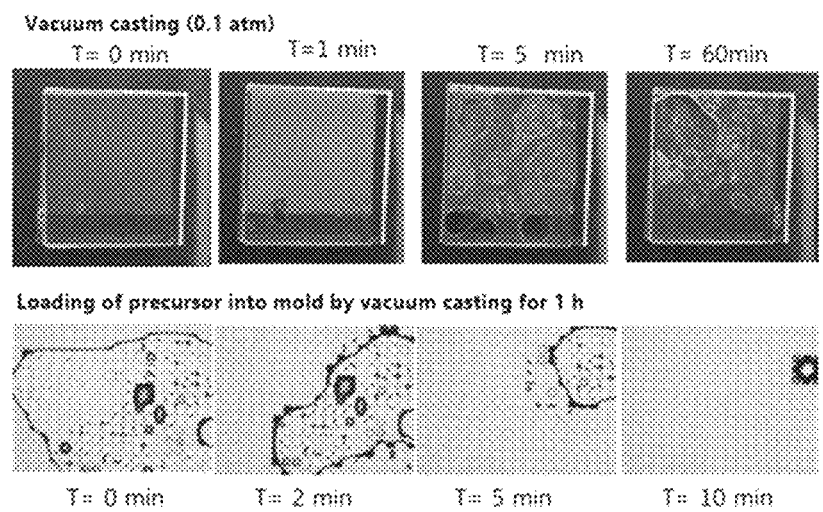
[FIG. 6C]
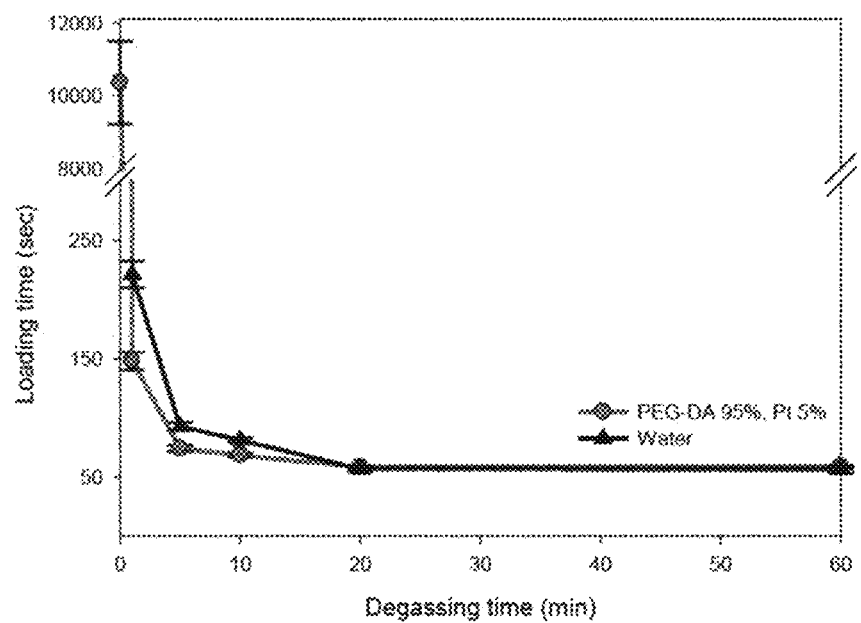

[FIG. 6D]
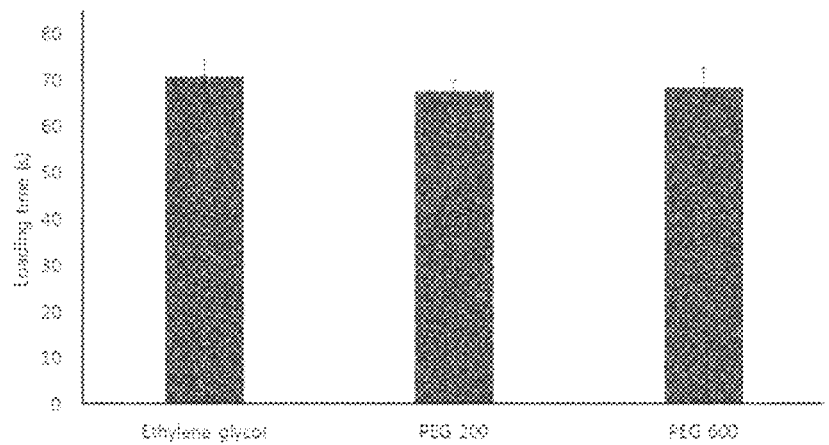
[FIG. 7A]
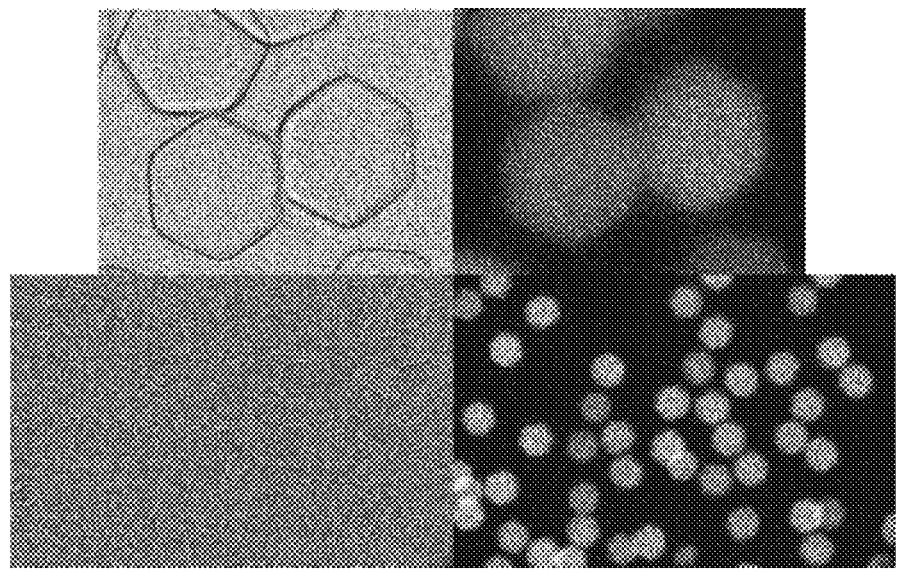

[FIG. 7B]
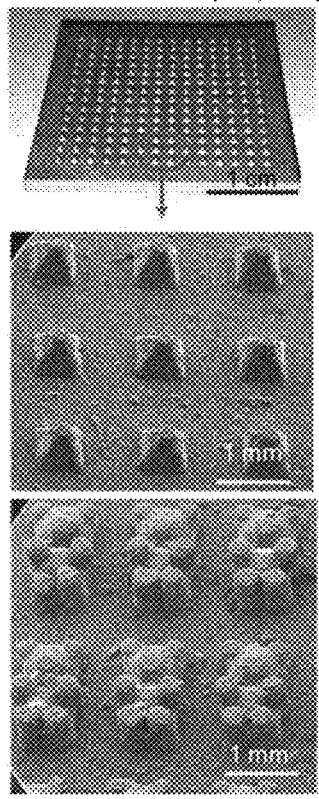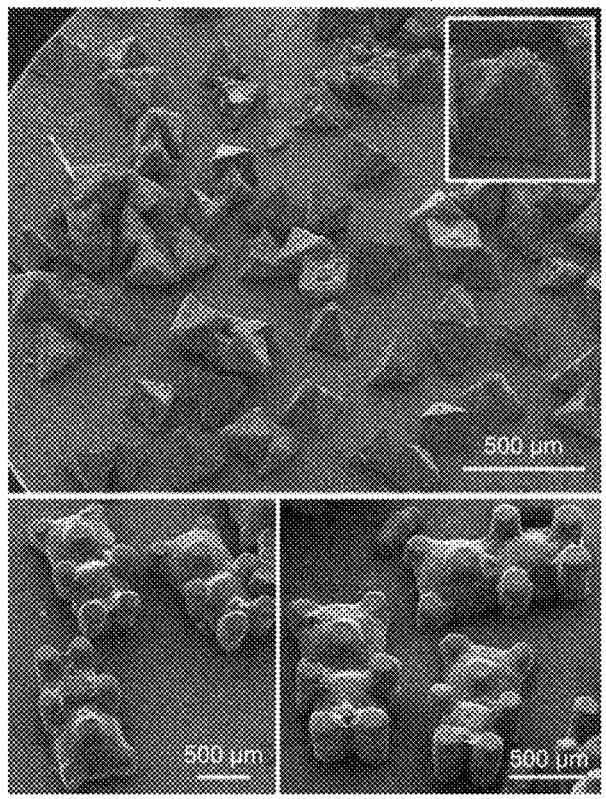
[FIG. 7C]
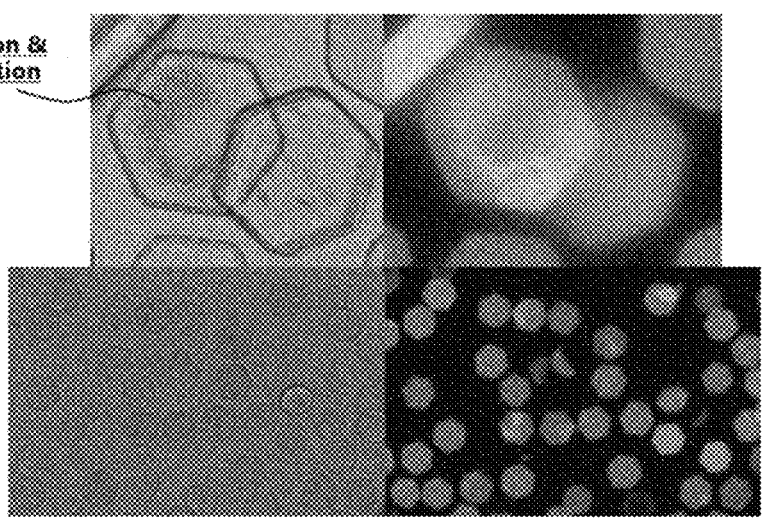

METHOD FOR PRODUCING MICROPARTICLES

TECHNICAL FIELD

The present invention relates to a method for producing microparticles, and more specifically to a technology for synthesizing microparticles using a degassed micromold.

BACKGROUND ART

Microparticles are highly reactive due to their high surface area to volume ratio and are thus advantageously used to detect very small amounts of samples. Particularly, asymmetrically shaped microparticles can be encoded depending on their recognized shapes. Based on the assigned codes, the microparticles can be easily distinguished even when mixed with other types of microparticles. Accordingly, the use of a mixture of microparticles loaded with different detection probes enables simultaneous detection/analysis of biomolecules, which is advantageous for multiplexed diagnosis. Due to this advantage, microparticles are actively used in the field of liquid biopsy.

Replica molding has recently been proposed as a technique for producing microparticles. Replica molding uses simple equipment to produce microparticles and is performed by loading a polymer precursor solution into a micromold engraved with a micropattern, pressing the polymer precursor solution with a cover, and curing the polymer precursor solution to synthesize polymeric microparticles. The resulting microparticles have a shape corresponding to the micropattern. When the surface energy of the precursor solution is lower than that of the cover, it is necessary to increase the surface area of the cover for stabilization of the system. In this case, however, the surface of the cover is wetted to a thickness of several tens to hundreds of nanometers with the precursor solution after pressing with the cover, with the result that the entire region of the cover wetted with the precursor solution is cured during polymerization, making it difficult to produce independent particles.

The synthesis of uniformly shaped microparticles requires complete filling of the precursor solution in the micropattern without leaving voids. When the micromold is hydrophobic and the precursor solution is a lipophilic liquid whose surface energy is lower than that of the hydrophobic micromold, the precursor solution is spontaneously loaded into the micropattern by capillary action. Alternatively, when the precursor solution is hydrophilic, the precursor solution is not loaded spontaneously or is loaded very slowly. Conventionally, air bubbles present between the micromold and the precursor solution are removed under vacuum or by physical scraping. However, long-term exposure of the precursor solution to vacuum or ambient pressure leads to evaporation of the precursor solution, making it difficult to synthesize particles of uniform quality and causing damage to the micromold during the experiments. In an effort to solve these problems, replica molding is performed under high humidity conditions to minimize evaporation of the precursor solution. However, this approach does not provide a fundamental solution because only limited types of solvents can be used to suppress evaporation of the precursor solution. Since the time required to load the hydrophilic precursor solution increases as the area of the micromold increases, it is not appropriate to enlarge the micromold, making it difficult to produce microparticles on a large scale.

Thus, there is an urgent need for a solution to the problems of replica molding.

DETAILED DESCRIPTION OF THE INVENTION

Problems to be Solved by the Invention

The present invention has been made in an effort to solve the problems of the prior art and one aspect of the present invention is to provide a method for producing microparticles in which a porous micromold is degassed such that a precursor solution is quickly loaded into the micromold through the suction force of the micromold regardless of the viscosity and wettability of the precursor solution.

A further aspect of the present invention is to provide a method for producing microparticles in which a cover substrate as well as a micromold is degassed such that the concentrations of oxygen in the micromold and the cover substrate are simultaneously reduced to form an inhibition layer in a wet precursor solution between the micromold and the cover substrate, enabling the synthesis of independent and internally structured microparticles with high replication resolution

Means for Solving the Problems

A method for producing microparticles according to an embodiment of the present invention includes (a) preparing a porous micromold having a plurality of recessed microcavities with a predetermined shape and size on one surface thereof and preparing a cover substrate, (b) degassing the micromold in a vacuum chamber, (c) taking the degassed micromold out of the vacuum chamber, arranging a microparticle precursor solution between the one surface of the micromold and one surface of the cover substrate, and filling the microparticle precursor solution in the microcavities, (d) polymerizing the microparticle precursor in the microparticle precursor solution to synthesize microparticles, and (e) recovering the microparticles.

Step (a) may include: fabricating a master mold having an embossed pattern corresponding to the microcavities; and pouring a polymer solution onto the master mold and curing the polymer solution to manufacture the micromold.

The micromold may be made of one or more polymers selected from the group consisting of polydimethylsiloxane (PDMS), PDMS modified urethane acrylate (PUA), perfluoropolyether (PFPE), and polyethylene (PE).

The method may further include attaching a support plate to each of the other surface of the micromold and the other surface of the cover substrate before arrangement of the microparticle precursor solution.

In step (b), the pressure of the vacuum chamber may be reduced to 0.9 bar or less.

The microparticle precursor solution may be filled in the microcavities by the suction force of the degassed micromold.

In step (c), the distance between the micromold and the cover substrate may be reduced by pressing after filling of the microparticle precursor solution.

In step (d), oxygen in the pores of the micromold and the cover substrate may be introduced into the microcavities to form an inhibition layer in a region surrounding the surfaces of the microparticles that impedes polymerization of the microparticle precursor.

The thickness of the inhibition layer may be controlled depending on the degree of degassing in step (b).

The cover substrate may be made of one or more materials selected from the group consisting of glass, silicone, metals, and gas impermeable polymers.

The cover substrate may be made of one or more polymers selected from the group consisting of polydimethylsiloxane (PDMS), PDMS modified urethane acrylate (PUA), perfluoropolyether (PFPE), and polyethylene (PE).

The microparticle precursor may include a polymeric monomer.

In step (d), the microparticle precursor may be polymerized by light, heat, redox or ultrasonic waves.

The features and advantages of the present invention will become apparent from the following description with reference to the accompanying drawings.

Prior to the detailed description of the invention, it should be understood that the terms and words used in the specification and the claims are not to be construed as having common and dictionary meanings but are construed as having meanings and concepts corresponding to the technical spirit of the present invention in view of the principle that the inventor can define properly the concept of the terms and words in order to describe his/her invention with the best method.

Effects of the Invention

According to the method of the present invention, since the precursor solution can be loaded into the degassed gas permeable micromold in the closed system within a short time by the suction force of the micromold, its evaporation is minimized so that particles of the same chemical quality can be synthesized by replica molding. Since the precursor solution is loaded regardless of the area of the micromold, it is possible to enlarge the micromold. The use of the large area micromold can contribute to the development of a system for the mass production of microparticles.

In addition, the method of the present invention uses the suction force of the degassed micromold rather than capillary action, unlike conventional methods. Accordingly, even a liquid with low wettability such as water can be loaded into the micromold, resulting in the production of various types of microparticles. The formation of the inhibition layer on the surface of the micromold during radical polymerization due to the high oxygen permeabilities of the micromold and the cover substrate leads to the synthesis of independent microparticles because no polymerization proceeds in a region wetted with the precursor solution between the substrate and the micromold.

Furthermore, as the concentration of oxygen in the micromold is reduced by degassing the micromold, the inhibition layer becomes thinner, enabling the synthesis of small-sized clear particles compared to particles synthesized by conventional replica molding techniques. Moreover, the method of the present invention enables the synthesis of internally structured complex microparticles.

BRIEF DESCRIPTION OF THE DRAWINGS

FIGS. 1A to 5A illustrate a method for producing microparticles according to an exemplary embodiment of the present invention.

FIG. 5B is an enlarged view of circle "A" of FIG. 5A and FIG. 5C is a perspective view illustrating one of the microcavities illustrated in FIGS. 1A to 5A.

FIG. 6A shows the results obtained when a precursor was loaded at different rates in Example 3-1, FIG. 6B shows the results obtained when a precursor was loaded at different rates in Comparative Example 1-1, and FIGS. 6C and 6D show the loading times of a precursor in Example 3-1 and the times it took to complete the loading of fluids having different viscosities into a degassed micromold, respectively.

FIG. 7A shows images of microparticles synthesized in Example 4, FIG. 7B shows SEM images of a three-dimensional master mold fabricated in Example 1-2 and SEM images of three-dimensional microparticles synthesized based on the master mold, and FIG. 7C shows images of microparticles synthesized in Comparative Example 2.

BEST MODE FOR CARRYING OUT THE INVENTION

Figure 8:
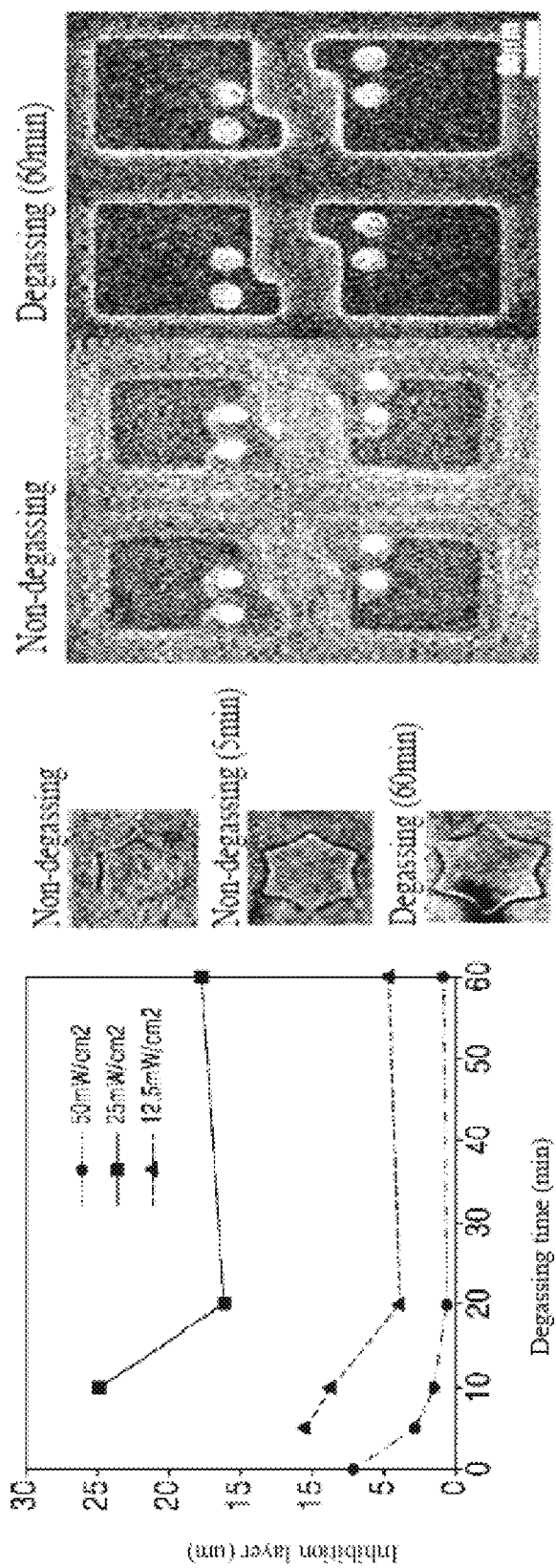
FIG. 8 shows the thicknesses of inhibition layers formed in Example 4 and Comparative Example 2 and merged images of internally structured particles synthesized in Example 4 and Comparative Example 2.

Other objects, advantages, and novel features of the invention will become more apparent from the following detailed description and preferred embodiments with reference to the appended drawings. In the drawings, the same elements are denoted by the same reference numerals even though they are depicted in different drawings. Although such terms as "first" and "second," etc. may be used to describe various elements, these elements should not be limited by above terms. These terms are used only to distinguish one element from another. In the description of the present invention, detailed explanations of related art are omitted when it is deemed that they may unnecessarily obscure the essence of the present invention.

Preferred embodiments of the present invention will now be described in detail with reference to the accompanying drawings.

FIGS. 1A to 5A illustrate a method for producing microparticles according to an exemplary embodiment of the present invention. FIG. 5B is an enlarged view of circle "A" of FIG. 5A and FIG. 5C is a perspective view illustrating one of the microcavities illustrated in FIGS. 1A to 5A.

The method includes (a) preparing a porous micromold 10 having a plurality of recessed microcavities 11 with a predetermined shape and size on one surface thereof and preparing a cover substrate 20, (b) degassing the micromold 10 in a vacuum chamber 40, (c) taking the degassed micromold 10 out of the vacuum chamber 40, arranging a microparticle precursor solution 50 between one surface of the micromold 10 and one surface of the cover substrate 20, and filling the microparticle precursor solution 50 in the microcavities 11, (d) polymerizing the microparticle precursor in the microparticle precursor solution 50 to synthesize microparticles 60, and (e) recovering the microparticles 60.

The present invention is directed to a method for producing polymeric microparticles. According to a conventional replica molding technique, a polymer precursor solution is loaded into a micromold engraved with a micropattern and cured to synthesize microparticles. However, when the precursor solution is hydrophilic, its loading does not occur spontaneously. For this reason, air bubbles present in the micropattern need to be removed by vacuum casting or physical scraping for a long time, with the result that the precursor solution is evaporated, failing to ensure uniform quality of final particles. The very slow loading of the hydrophilic precursor solution makes it difficult to mass produce nanoparticles. Another problem of the conventional technique is that the presence of atmospheric oxygen at a high concentration between the micromold and a cover leads to the formation of a thick inhibition layer during the production of particles by polymerization, making it difficult to synthesize internally structured complex particles. The method of the present invention provides a solution to the problems encountered in the conventional technique.

As described above, the method of the present invention includes preparing a micromold and a cover substrate, degassing the micromold, filling a microparticle precursor solution in microcavities, synthesizing microparticles, and recovering the microparticles.

FIG. 1A illustrates the preparation of a micromold 10 and a cover substrate 20. The micromold 10 is made of a porous material. The porous material may be a polymer, for example, polydimethylsiloxane (PDMS), PDMS modified urethane acrylate (PUA), perfluoropolyether (PFPE), polyethylene (PE) or a mixture thereof but is not necessarily limited thereto. Any suitable porous gas permeable elastomer may also be used without limitation for the micromold.

The cover substrate 20 may be made of the same porous material for the micromold 10 but is not necessarily limited thereto. A gas impermeable material may also be used for the cover substrate 20. For example, the cover substrate may be made of at least one material selected from the group consisting of glass, silicone, metals, and gas impermeable polymers (e.g., PE, PMMA, PVC, and NOA81).

The micromold 10 has a plurality of microcavities 11 formed on one surface thereof. The microcavities 11 refer to recessed internal spaces with a predetermined shape and size. A microparticle precursor solution 50 is filled and cured in the microcavities 11 to produce microparticles having the predetermined shape of the microcavities 11, which will be described below. That is, the shape of the microcavities 11 determines the shape of final microparticles and may vary depending on the desired shape of two- or three-dimensional microparticles (see FIGS. 7A and 7B). As an example, the microcavities may be holes having a circular, polygonal or star-like cross-sectional shape in a direction perpendicular to the depth direction. Protrusions may be formed on the bottom of each of the holes, resulting in the synthesis of internally structured hollow microparticles (see FIGS. 5C and 8). The plurality of microcavities 11 may be aligned in an array and may have the same or different shapes and sizes.

The micromold 10 can be manufactured by various techniques. For example, the micromold 10 may be manufactured using a master mold 7 fabricated by photolithography, as illustrated in FIG. 1B. First, a photoresist is coated on the substrate 1 to form a photoresist film 3. A mask 5 is placed over the photoresist film 3 and ultraviolet (UV) light is irradiated onto the photoresist film to fabricate a master mold 7 having an embossed pattern corresponding to the microcavities 11. Next, a polymer solution 9 is poured onto the master mold 7 and cured to manufacture the micromold 10. Alternatively, the master mold may be fabricated by 3D printing, E-beam lithography or replica molding instead of photolithography. Thereafter, a polymer solution is poured onto the master mold and cured to manufacture the micromold 10.

When loaded with a microparticle precursor solution 50, the micromold 10 is arranged such that the one surface of the micromold 10 faces one surface of the cover substrate 20. A support plate 30 may be attached to each of the other surface of the micromold 10 and the other surface of the cover substrate 20. The support plates 30 are members that serve to prevent the micromold 10 and the cover substrate 20 from being bent by an external force and control the direction in which oxygen permeates. The attachment of the support plates 30 is not necessarily required when the micromold 10 and the cover substrate 20 are prepared. The support plates 30 may be attached to the micromold 10 and the cover substrate 20 at any time before arrangement of a microparticle precursor solution 50, which will be described below.

Thereafter, the micromold 10 is degassed, as illustrated in FIG. 2. Specifically, the micromold 10 is placed in a vacuum chamber 40 and gas is removed from the pores of the porous micromold 10 under reduced pressure. Here, the internal pressure may be reduced to 0.9 bar and is preferably maintained in the range of 0.01 to 0.9 bar. After completion of the degassing, the pressure in the pores of the porous micromold 10 is lowered, allowing the micromold 10 to have a suction force to suck a fluid at atmospheric pressure.

The cover substrate 20 may be made of a porous material. In this case, the cover substrate 20 may be placed in the vacuum chamber 40 and degassed under the same conditions as the micromold 10.

After completion of the degassing, a microparticle precursor solution is filled. Referring to FIG. 3, the degassed micromold 10 is taken out of the vacuum chamber 40 and a microparticle precursor solution 50 is arranged between the one surface of the micromold 10 and the one surface of the cover substrate 20. Here, the microparticle precursor solution 50 may be placed on the one surface of the micromold 10 and covered with the cover substrate 20 (a first embodiment). Alternatively, the microparticle precursor solution 50 may be placed on the one surface of the cover substrate 20 and covered with the micromold 10 (a second embodiment), unlike that illustrated in FIG. 3. In this case, the microparticle precursor solution 50 is pressed down and spreads radially by the weight of the cover substrate 20 (for the first embodiment) or the micromold 10 (for the second embodiment) and the microparticle precursor solution 50 is filled in the microcavities 11 by the suction force of the degassed micromold 10.

That is, the suction force of the degassed micromold 10 is used to load the microparticle precursor solution 50 into the micromold. According to the method of the present invention, since the microparticle precursor solution 50 is loaded into the microcavities 11 in the closed system within several tens of seconds, its evaporation is minimized so that chemically uniform particles can be synthesized. In addition, a liquid with low wettability such as water can be loaded into the micromold and the loading time is hardly affected by the viscosity of the microparticle precursor solution 50, resulting in the synthesis of various types of microparticles. Furthermore, since the loading time of the microparticle precursor solution 50 is the same regardless of the area of the micromold 10, it is possible to enlarge the micromold 10. Therefore, an increased amount of the microparticle precursor solution 50 can be loaded into the enlarged micromold 10 so that microparticles can be produced on a large scale.

After filling of the microparticle precursor solution 50, the micromold 10 and the cover substrate 20 may be pressed against each other such that they are positioned as close as possible (see FIG. 4). Here, clamps, tongs, magnets or weights may be used as means for pressing. Any pressing means that can exert pressures on the micromold 10 and the cover substrate 20 may be used without particular limitation.

Next, microparticles are synthesized, as illustrated in FIG. 5A. To this end, the filled microparticle precursor solution 50 may be cured by irradiation with light (e.g., UV), by heating or sonication or through a redox reaction. However, the curing mechanism of the microparticle precursor solution 50 is not dependent on light, heat, ultrasonic waves or redox. Any mechanism capable of polymerizing the microparticle precursor in the microparticle precursor solution 50 may be used to synthesize microparticles.

The microparticle precursor solution 50 may include a polymeric monomer as the microparticle precursor. The polymeric monomer is radically polymerized by light or heat to synthesize polymeric microparticles. The polymeric monomer may be a crosslinkable monomer containing photocurable or heat-curable crosslinkable functional groups. The heat-curable or photocurable functional groups may be, for example, acrylic, epoxy, methacrylic, vinyl, amino or hydroxyl groups. The polymeric monomer having the crosslinkable functional groups may be selected from the group consisting of, but not necessarily limited to, polyethylene glycol diacrylate (PEGDA), polyethylene glycol dimethacrylate (PEGDM), polypropylene glycol diacrylate (PPGDA), and mixtures thereof. Alternatively, the polymeric monomer may be a non-crosslinkable one. In this case, the microparticle precursor solution 50 may further include a crosslinkable polymeric monomer containing crosslinkable functional groups and a crosslinking agent for curing. The microparticle precursor solution 50 may further include a thermal initiator or a photoinitiator. Examples of suitable thermal initiators include, but are not limited to, peroxide compounds and azo compounds. Examples of suitable photoinitiators include, but are not limited to, benzoin compounds, hydroxy ketone compounds, and amino ketone compounds.

During polymerization into microparticles 60, oxygen in the pores of the porous micromold 10 is introduced into the microcavities 11 to form an inhibition layer 55, where the microparticle precursor is not polymerized, in a region defined by the one surface of the micromold 10, the inner surfaces of the microcavities 11, and the one surface of the cover substrate 20 that are in contact with the microparticle precursor solution 50 (see FIG. 5B). The inhibition layer 55 is a layer where oxygen impedes polymerization of the polymeric monomer. Accordingly, the inhibition layer formed in the region surrounding the surfaces of the microparticles 60 separates the microparticles 60 from the micromold 10 and the cover substrate 20, making the microparticles 60 independent.

The thickness of the inhibition layer 55 increases in proportion to the concentration of oxygen. Since the concentration of oxygen in the pores of the micromold 10 after degassing is low compared to that before degassing, the inhibition layer 55 is made thin, making the synthesized microparticles 60 clear. A more detailed description will be given with reference to FIG. 5C. Each of the microcavities 11 may be in the form of a quadrangular through hole penetrating in the thickness direction thereof and may be internally structured by two pillar protrusions P1 and P2 formed on the bottom of the quadrangular hole. Gap G1 between the two protrusions P1 and P2 and gap G2 between each of the protrusions P1 and P2 and the inner surface of the quadrangular hole may be very small. After degassing of the micromold 10, very thin inhibition layers 55 are formed surrounding the protrusions P1 and P2. The inhibition layers 55 surrounding the protrusions P1 and P2 are thin enough not to meet each other. The inhibition layers 55 surrounding the protrusions P1 and P2 are also separated from the inhibition layer 55 formed on the inner surfaces of the quadrangular hole (see FIG. 5B). As a result, the microparticle 60 is also synthesized in the gaps G1 and G2 (see FIG. 5B). In contrast, according to a conventional replica molding technique using a non-degassed micromold, the high concentration of oxygen in the micromold leads to the formation of thick inhibition layers in the gaps G1 and G2, and as a result, the microparticle cannot be synthesized in the gaps. Therefore, according to the method of the present invention, three-dimensional internal structures can be reflected in the microparticles 60 with higher replication resolution.

The thickness of the inhibition layer 55 can be controlled by varying the degree of degassing so that the microparticles 60 can be delicately synthesized even by irradiation with low intensity UV light. Here, the degree of degassing is determined depending on the internal pressure and degassing time of the vacuum chamber 40. In conclusion, the shape of the microparticles 60 can be controlled by varying not only the shape and size of the microcavities 11 but also the degree of degassing and the intensity of UV. The use of the porous cover substrate 20 ensures more effective formation of the to inhibition layer 55.

External oxygen may enter the edge microcavities 11 through the outer surfaces of the micromold 10 in the course of synthesizing the microparticles 60. In this case, the concentration of oxygen in the outermost microcavities 11 is higher than that in the central microcavities 11. Accordingly, the size of the microparticles 60 synthesized in the outermost microcavities 11 is relatively small. This problem can be avoided by disposing spacers between the edges and the microcavities 11 such that the microcavities 11 are spaced sufficient distances from the edges toward the center. The spacers do not have to completely block external oxygen from entering the microcavities 11. Optionally, the spacers serve to adjust the distances between the edges of the micromold 10 and the outermost microcavities 11 to allow a controlled amount of external oxygen to enter the microcavities. That is, the spacers can also be used as elements for controlling the size of the microparticles 60.

Finally, the microparticles are recovered. Specifically, after the micromold 10 and the cover substrate 20 are separated from each other, the microparticles 60 are recovered. The microparticles 60 can be recovered by pouring a solvent onto the micromold 10 or immersing the micromold 10 in a solvent because they are not firmly bound to the microcavities 11 by the inhibition layer 55 formed on the surfaces thereof. Alternatively, the microparticles 60 may be recovered by loading a liquid material at room temperature on the one surface of the micromold 10, cooling and curing the liquid material, and detaching the cured material together with the microparticles 60. For example, the material may be PEG600 that is cured at −20 to 20° C.

Mode for Carrying Out the Invention

The present invention will be explained more specifically with reference to the following examples, comparative examples, and evaluation examples thereof.

Example 1-1

Preparation of Micromold and Cover Substrate

A micropattern for synthesizing microparticles was designed by the AutoCAD program and printed on a photomask film. SU-8, a negative photosensitizer, was cured by a typical photolithography process to fabricate a master mold. A mixed solution of PDMS and a curing agent in a ratio of 10:1 was poured onto the master mold, air bubbles were removed under reduced pressure in a vacuum chamber for 30 min, and the PDMS was cured at 70° C. for 4 h. The cured PDMS was detached from the master mold and cut to a specific size to manufacture a micromold. A cover substrate was made of the same material for the micromold. Each of the micromold and the cover substrate was prepared to a size of 1.5×1.5 cm and a thickness of 0.3 mm. Microcavities having dimensions of 100 (width)×100 (length)×25 µm³ (depth) were formed in the micromold.

Example 1-2

Preparation of Micromold and Cover Substrate

A master mold was fabricated in the same manner as in Example 1-1, except that 3D printing was used instead of photolithography. Then, 1-1-1-4-fluorochloride was chemically deposited on the master mold in a vacuum chamber at 0.1 atm for 24 h. Thereafter, a mixed solution of PDMS and a curing agent was poured onto the master mold. The subsequent procedure was the same as in Example 1-1 to prepare a micromold and a cover substrate.

Example 2

Preparation of Microparticle Precursor Solutions

94% of polyethylene glycol diacrylate (PEG-DA, MW:700), 5% of Darocur1173, and 1% of rhodamine-B-acrylate (in PEG200 with 1%) were mixed to prepare a rhodamine-bound microparticle precursor solution. 25% of polyethylene glycol diacrylate (PEG-DA, MW: 700), 5% of Darocur1173, 20% of PEG200, and 50% of FITC-BSA (10 mg/mL) were mixed to prepare a protein-bound microparticle precursor solution.

Example 3-1

Loading of the Rhodamine-Bound Microparticle Precursor Via Degassing

The micromold and the cover substrate prepared in each of Examples 1-1 and 1-2 were placed in a vacuum chamber, degassed at 0.1 atm for 1 h, and taken out of the vacuum chamber. 40 µl of the rhodamine-bound microparticle precursor solution prepared in Example 2 was placed on the cover substrate and the micromold was placed on the microparticle precursor solution.

Example 3-2

Loading of the Protein-Bound Microparticle Precursor

The procedure of Example 3-1 was repeated except that the protein-bound microparticle precursor solution prepared in Example 2 was loaded instead of the rhodamine-bound microparticle precursor solution and was allowed to stand for 1 min.

Example 4

Synthesis and Recovery of Microparticles

After each of Examples 3-1 and 3-2, the micromold and the cover substrate were pressed against each other with tongs, followed by irradiation with UV light from an LED lamp to synthesize microparticles.
Thereafter, the tongs were removed to separate the micromold and the cover substrate. PEG600 was filled in the micromold and the cover substrate, cured at ~4° C. for 30 min, and removed from the micromold to recover microparticles.

Comparative Example 1-1

Loading of the Rhodamine-Bound Microparticle Precursor by Vacuum Casting

40 µl of the rhodamine-binding microparticle precursor solution was placed on the cover substrate and the micromold was placed on the microparticle precursor solution, as in Example 3-1. Then, the micromold and the cover substrate were placed in a vacuum chamber and maintained at a reduced pressure of 0.1 atm for 1 h to load the microparticle precursor solution into the micromold.

COMPARATIVE Example 1-2

Loading of the Protein-Bound Microparticle Precursor by Vacuum Casting

The procedure of Comparative Example 1-1 was repeated except that the protein-bound microparticle precursor solution prepared in Example 2 was loaded instead of the rhodamine-bound microparticle precursor solution.

COMPARATIVE Example 2

Synthesis and Recovery of Microparticles

After each of Comparative Examples 1-1 and 1-2, microparticles were synthesized and recovered in the same manner as in Example 4.

EVALUATION Example 1

Comparison of Loading Rates of the Precursor Solutions

FIG. 6A shows the results obtained when the precursor was loaded at different rates in Example 3-1 and FIG. 6B shows the results obtained when the precursor was loaded at different rates in Comparative Example 1-1.
Specifically, FIGS. 6A and 6B are photographs (top) and microscopy images (bottom) taken at different times during loading of the precursor solution in Example 3-1 and Comparative Example 1-1, respectively. Referring to FIGS. 6A and 6B, filling of the precursor solution was completed after ~60 sec in Example 3-1 whereas it took ≥10 min to complete the loading of the precursor solution in Comparative Example 1-1. These results are believed to be because only air layers between the precursor solution and the mold were absorbed by the suction force of the degassed micromold, resulting in a significant increase in loading rate. Referring to the photographs (top) shown in FIG. 6B, air bubbles were generated during degassing of the porous PDMS micromold in the vacuum chamber and push out the surrounding precursor solution to form huge air layers. In contrast, this phenomenon was not observed when the degassed micromold was used in Example 3-1 (see FIG. 6A).

EVALUATION Example 2

Evaluation of Loading Times of the Precursor Solutions

FIG. 6C shows the loading times of the precursor in Example 3-1.
The times it took to complete filling of the precursor during loading of the precursor solution in Example 3-1 were observed and evaluated as a function of degassing time and compared with those during loading of water. The results are shown in FIG. 6C. Referring to FIG. 6C, as the degassing time increased, the loading time of the precursor solution tended to decrease regardless of the type of the solution. Particularly, the loading time was maintained constant from the time when the degassing time exceeded ~20 min.

FIG. 6D shows the times it took to complete the loading of fluids having different viscosities into the degassed micromold. The loading times of ethylene glycol (E. G), PEG200, and PEG600 instead of the precursor solution were measured under the same conditions as in FIG. 6A. There were no differences in the loading time of E. G, PEG200, and PEG600 despite their different viscosities (16.1 mPa·s, 70 mPa·s, and 150-190 mPa·s, respectively). These results concluded that even the solutions with different viscosities can be loaded quickly into the micromold.

Evaluation Example 3

Evaluation of the Synthesized Microparticles

FIG. 7A shows images of the microparticles synthesized in Example 4, FIG. 7B shows SEM images of the three-dimensional master mold fabricated in Example 1-2 and SEM images of the three-dimensional microparticles synthesized based on the master mold, and FIG. 7C shows images of the microparticles synthesized in Comparative Example 2.

FIGS. 7A and 7C show microscopy images of the microparticles synthesized in Example 4 and Comparative Example 2, respectively. Referring to FIG. 7A, the microparticles were well-defined and uniform and the fluorescence characteristics of the bound fluorescent material were also uniform.

In contrast, water was vaporized from the protein-containing precursor solution in Comparative Example 2, and as a result, the protein aggregated without being dispersed. The fluorescence characteristics were very non-uniform and the particles were less uniform than the particles synthesized in Example 4. These results are thought to be because the protein aggregated as a result of water vaporization during loading of the precursor for ~10 min.

FIG. 7B shows SEM images of the three-dimensional master mold fabricated in Example 1-2 and SEM images of the three-dimensional microparticles synthesized based on the master mold. Referring to FIG. 7B, the three-dimensionally shaped microparticles were delicately synthesized.

Evaluation Example 4

Evaluation of Thicknesses of Inhibition Layers

FIG. 8 shows the thicknesses of inhibition layers formed in the course of synthesizing the microparticles in Example 4 and Comparative Example 2 and images of the microparticles.

The inhibition layers formed in the course of synthesizing the microparticles in Example 4 and Comparative Example 2 were observed and evaluated. The results are shown in FIG. 8.

Referring to FIG. 8, the thickness of the inhibition layer tended to decrease as the degassing time increased and the intensity of UV light increased, indicating that the thickness of the inhibition layer can be controlled by varying the degree of degassing and the intensity of UV light.

The concentration of oxygen in the degassed micromold was reduced, resulting in a reduction in the thickness of the inhibition layer. As a result, the particles synthesized using the degassed micromold were smaller and clearer than the particles synthesized by vacuum casting.

EXPLANATION OF REFERENCE NUMERALS

| | |
|---|---|
| 1: Substrate | 3: Photoresist film |
| 5: Mask | 7: Master mold |
| 9: Polymer solution | 10: Micromold |
| 11: Microcavity | 20: Cover substrate |
| 30: Support plate | 40: Vacuum chamber |
| 50: Microparticle precursor solution | 55: Inhibition layer |
| 60: Microparticle | |

INDUSTRIAL APPLICABILITY

According to the present invention, since the precursor solution can be loaded into the degassed gas permeable micromold in the closed system within a short time by the suction force of the micromold, its evaporation is minimized so that particles of the same chemical quality can be synthesized by replica molding. Since the precursor solution is loaded regardless of the area of the micromold, it is possible to enlarge the micromold. The use of the large area micromold can contribute to the development of a system for the mass production of microparticles. Therefore, the present invention is considered industrially applicable.

The invention claimed is:

1. A method for producing microparticles comprising (a) preparing a porous micromold having a plurality of recessed microcavities with a predetermined shape and size on one surface thereof and preparing a cover substrate, (b) degassing the micromold in a vacuum chamber, (c) taking the degassed micromold out of the vacuum chamber, arranging a microparticle precursor solution between the one surface of the micromold and one surface of the cover substrate, and filling the microparticle precursor solution in the microcavities, (d) polymerizing the microparticle precursor in the microparticle precursor solution to synthesize microparticles, and (e) recovering the microparticles.

2. The method according to claim 1, wherein step (a) comprises: fabricating a master mold having an embossed pattern corresponding to the microcavities; and pouring a polymer solution onto the master mold and curing the polymer solution to manufacture the micromold.

3. The method according to claim 1, wherein the micromold is made of one or more polymers selected from the group consisting of polydimethylsiloxane (PDMS), PDMS modified urethane acrylate (PUA), perfluoropolyether (PFPE), and polyethylene (PE).

4. The method according to claim 1, further comprising attaching a support plate to each of the other surface of the micromold and the other surface of the cover substrate before arrangement of the microparticle precursor solution.

5. The method according to claim 1, wherein, in step (b), the pressure of the vacuum chamber is reduced to 0.9 bar or less.

6. The method according to claim 1, wherein the microparticle precursor solution is filled in the microcavities by the suction force of the degassed micromold.

7. The method according to claim 1, wherein, in step (c), a distance between the micromold and the cover substrate is reduced by pressing after filling of the microparticle precursor solution.

8. The method according to claim 1, wherein, in step (d), oxygen in the pores of the micromold and the cover substrate is introduced into the microcavities to form an inhibition layer in a region surrounding the surfaces of the microparticles that impedes polymerization of the microparticle precursor.

9. The method according to claim 8, wherein a thickness of the inhibition layer is controlled depending on the degree of degassing in step (b).

10. The method according to claim 1, wherein the cover substrate is made of one or more materials selected from the group consisting of glass, silicone, metals, and gas impermeable polymers.

11. The method according to claim 1, wherein the cover substrate is made of one or more polymers selected from the group consisting of polydimethylsiloxane (PDMS), PDMS modified urethane acrylate (PUA), perfluoropolyether (PFPE), and polyethylene (PE).

12. The method according to claim 1, wherein the microparticle precursor comprises a polymeric monomer.

13. The method according to claim 1, wherein, in step (d), the microparticle precursor is polymerized by light, heat, redox or ultrasonic waves.

* * * * *